Figure 1:
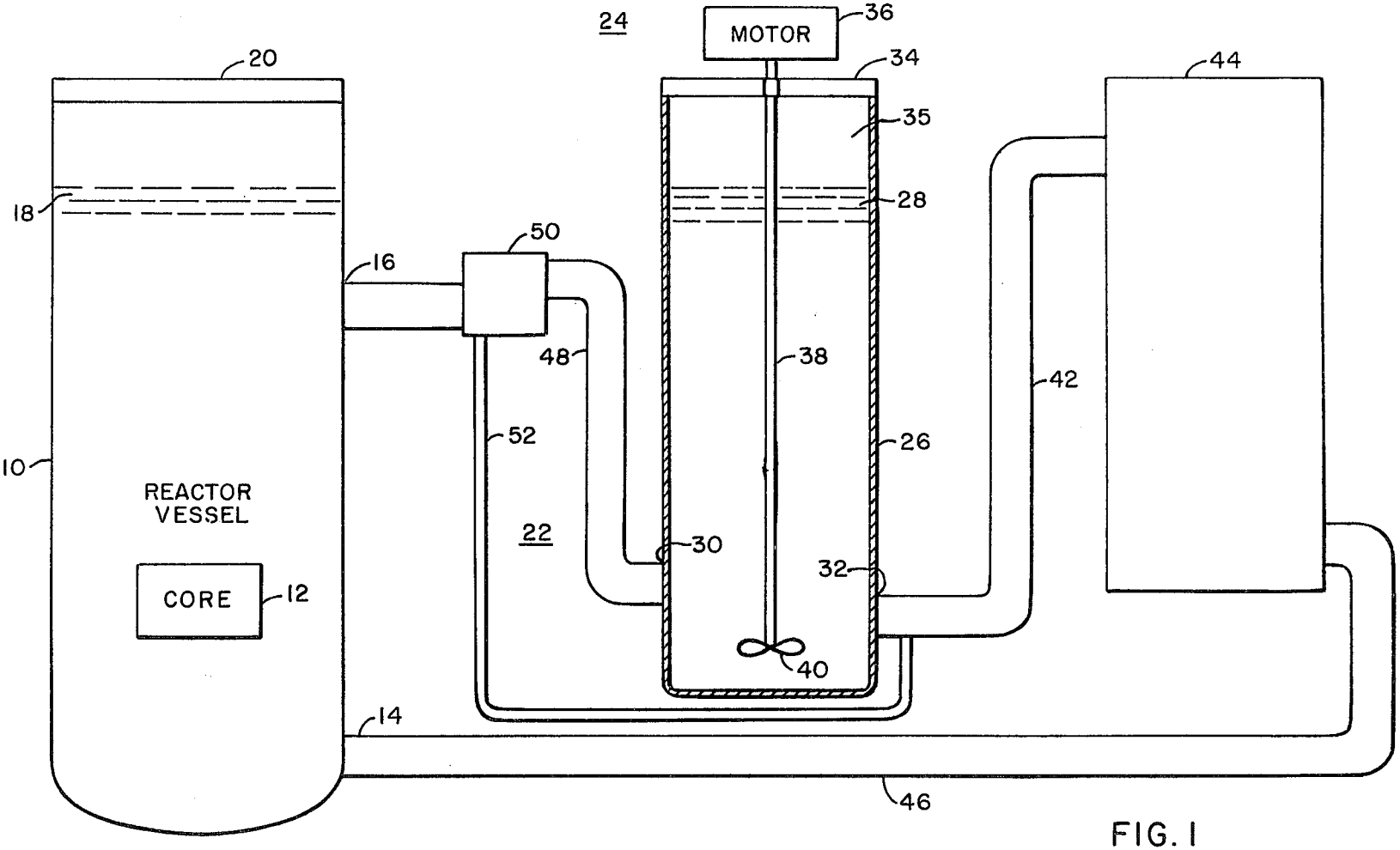
Figure 2:
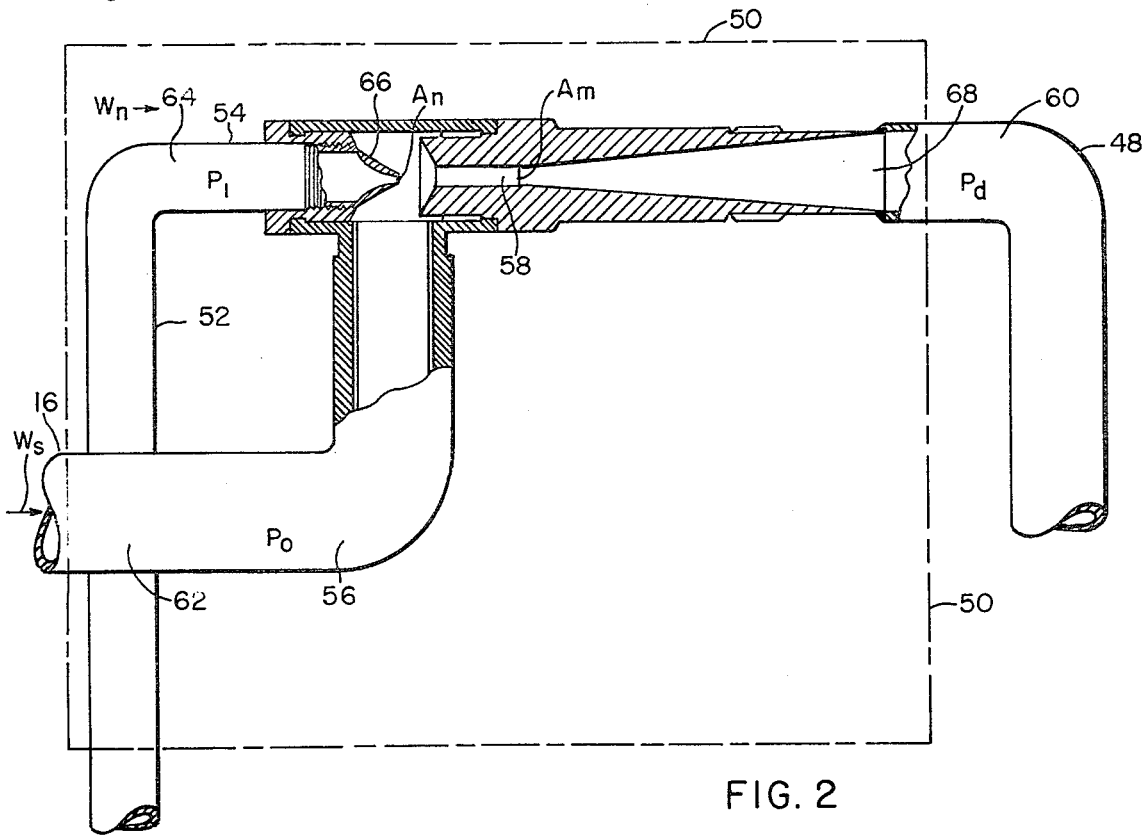
Figure 3:
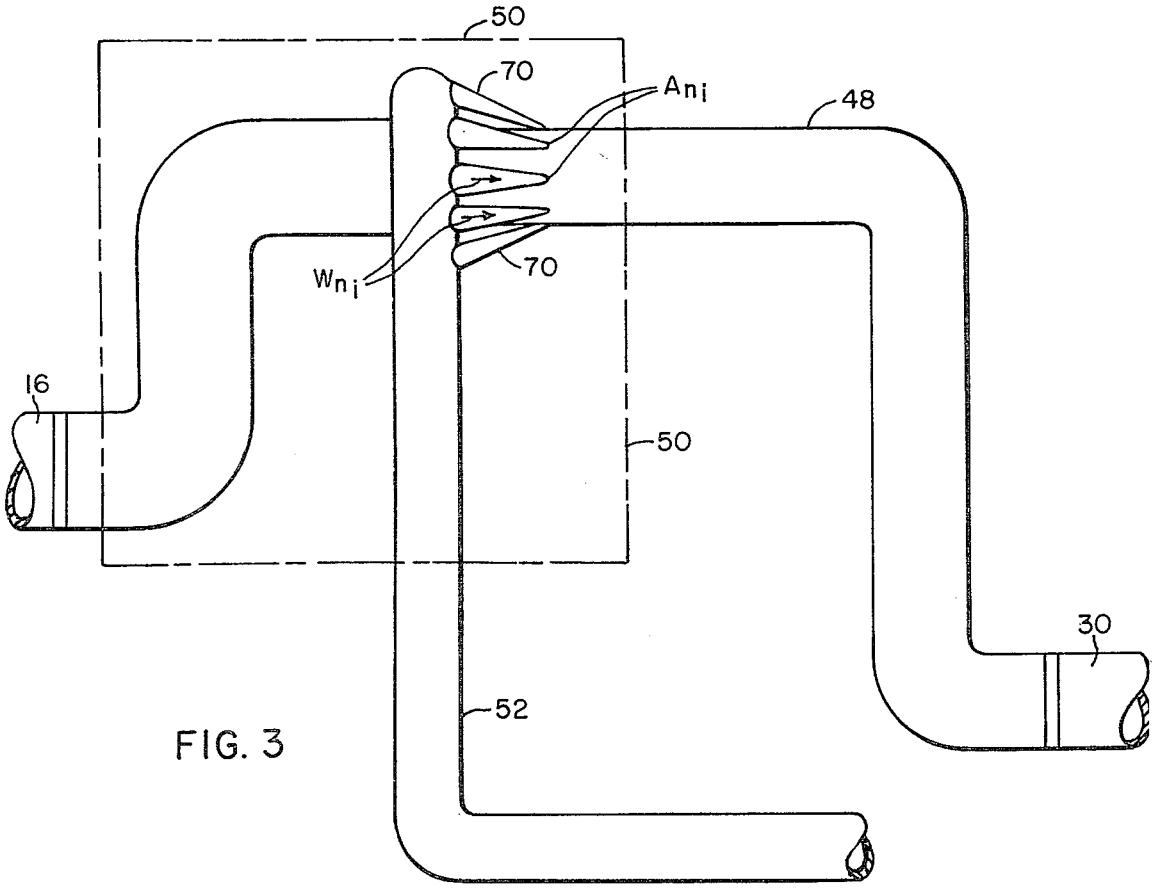

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 31

T945,008
NUCLEAR REACTOR COOLANT TRANSPORT SYSTEM

James D. Mangus, Greensburg, Pa., assignor to Westinghouse Electric Corporation, Pittsburgh, Pa.

Filed June 10, 1975, Ser. No. 585,727
**Int. Cl. G21c *15/00***
U.S. Cl. 176—50
2 Sheets Drawing. 15 Pages Specification

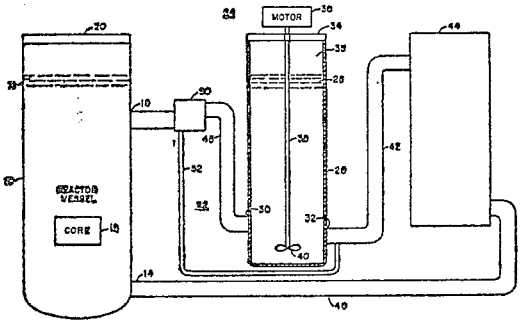

A system for transporting reactor coolant in nuclear reactors using a liquid coolant. The system diverts a portion of the output from the main circulating pump in the nuclear reactor primary flow system and introduces this diverted coolant back into the system upstream of the main circulating pump. This diverted coolant compensates for any pressure drop which may occur due to the pumping action, thereby maintaining a constant head to the circulating pump.

METHOD AND APPARATUS FOR OPERATING COMPUTER APPARATUS IN RESPONSE TO PROGRAM STATEMENTS

Original Filed Feb. 18, 1975